US006572113B2

(12) United States Patent
Care

(10) Patent No.: US 6,572,113 B2
(45) Date of Patent: Jun. 3, 2003

(54) SEAL FITTING

(75) Inventor: Ian C D Care, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/968,800

(22) Filed: Oct. 3, 2001

(65) Prior Publication Data
US 2002/0167132 A1 Nov. 14, 2002

(30) Foreign Application Priority Data
Oct. 19, 2000 (GB) ............................................. 0025627

(51) Int. Cl.[7] .............................................. F16J 15/16
(52) U.S. Cl. ...................... 277/410; 277/409; 277/412; 277/413; 277/421; 277/501; 277/544; 277/545; 277/378
(58) Field of Search .......................... 277/409, 410–411, 277/412–413, 421–2, 300, 501, 544–5, 378, 370; 267/157, 182, 161, 151

(56) References Cited

U.S. PATENT DOCUMENTS

| | | | |
|---|---|---|---|
| 3,406,979 A | * 10/1968 | Weber | 277/629 |
| 3,869,135 A | * 3/1975 | Diederich | 277/378 |
| 4,082,296 A | 4/1978 | Stein | |
| 4,171,818 A | * 10/1979 | Moskowitz et al. | 277/410 |
| 4,509,763 A | * 4/1985 | Fischer | 277/342 |
| 4,940,248 A | * 7/1990 | Kilthau et al. | 277/351 |
| 5,145,189 A | * 9/1992 | Pope | 277/544 |
| 5,161,804 A | * 11/1992 | Orlowski et al. | 277/378 |
| 5,203,849 A | * 4/1993 | Balsells | 267/1.5 |
| 5,217,232 A | * 6/1993 | Makhobey | 277/411 |
| 5,558,341 A | 9/1996 | McNickle | |
| 5,709,018 A | 1/1998 | Dugan | |
| 5,730,447 A | * 3/1998 | Dawson et al. | 277/378 |
| 5,934,684 A | * 8/1999 | Brandon et al. | 277/421 |
| 6,142,477 A | * 11/2000 | Meinzer | 277/378 |
| 6,220,602 B1 | * 4/2001 | Webster et al. | 277/410 |

FOREIGN PATENT DOCUMENTS

| | | |
|---|---|---|
| EP | 237770 A | 9/1987 |
| GB | 1540843 P | 2/1979 |

OTHER PUBLICATIONS

J. Mater, Journal of Materials Research, 1996, Materials Research Society, vol. 7, No. 2, p. 429.*
Calkins, Frederick T. et al., terfenol–D Sensor Design and Optimization, 2000, Iowa State University, p. 1.*

* cited by examiner

Primary Examiner—Anthony Knight
Assistant Examiner—Lisa Bannapradist
(74) Attorney, Agent, or Firm—W. Warren Taltavull; Manelli, Denison & Selter, PLLC

(57) ABSTRACT

A seal assembly for co-operation with a shaft comprising a seal member which, in use, in a first position, forms a seal against the shaft, a seal housing for retaining the seal member, means for applying a radially inward force to the seal member and means for applying a radially outward force to the seal member so that, when the means for applying a radially outwards force is operated, the seal member is dilated to a second position thereby enabling the seal assembly and the shaft to be fitted and disassembled in conventional manner, when the means for applying a radially outward force is removed the means for applying a radially inward force to the seal member returns the seal member to the first position.

23 Claims, 1 Drawing Sheet

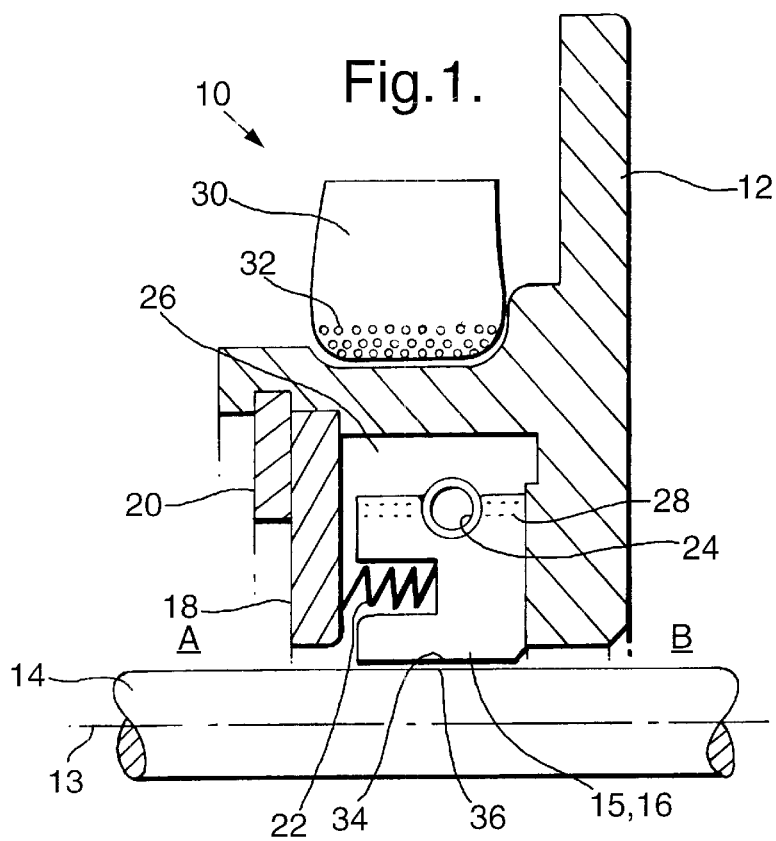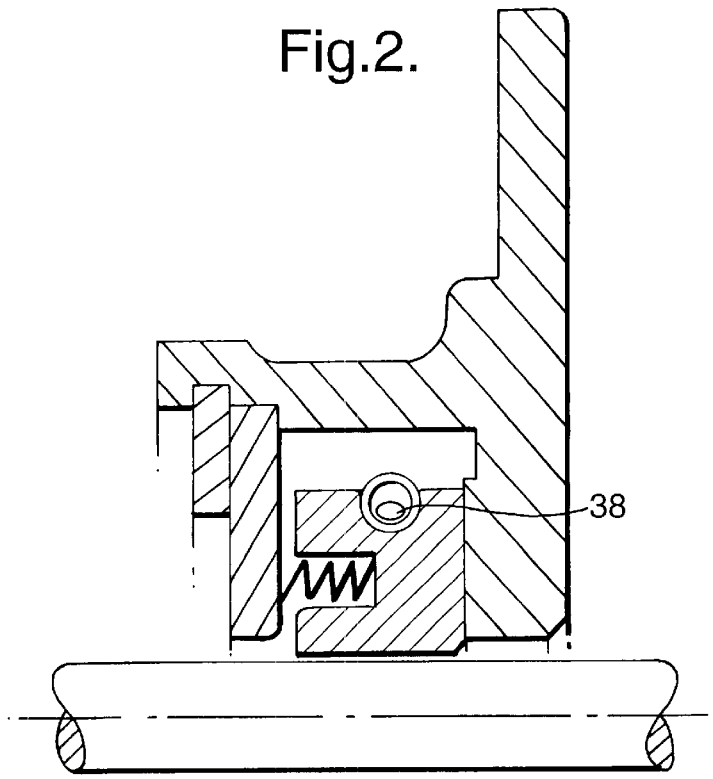

SEAL FITTING

FIELD OF THE INVENTION

This invention relates to an arrangement for an improved seal assembly.

BACKGROUND OF THE INVENTION

During assembly of a shaft and seal assembly comprising a contacting circumferentially segmented carbon seal, the complimentary sealing surfaces of the carbon seal and shaft are often damaged. As disclosed in U.S. Pat. Nos. 4,082,296 and 5,558,341 circumferentially segmented seals are sprung loaded against the housing so as to apply a radially inwardly pressure against the shaft. Conventionally during assembly a tool is inserted radially inward of the segmented seal, which is so arranged to then radially dilate the seal allowing the shaft to be inserted. The tool is then withdrawn in an axial direction.

In operation the housing is filled with a pressurised mixture of air and oil while higher pressure air is present outside the housing. The seal controls the amount of air entering the housing, between the rotating shaft and the seal ring, and also prevents oil escaping, from the housing, to the region outside the housing. The prevention of migration of a pressurised fluid across the seal may be optimised by providing the least possible clearance between the seal and the shaft surface. Although this type of seal is effectively a contact seal, a film of oil typically 1–3 molecules thick is preferably provided for lubrication between the seal and the shaft. It is essential therefore that the complimentary surfaces of the seal and shaft are not damaged in any way during assembly. It has been found that insertion and removal of the tool causes both axial scoring of the complimentary surfaces and chipping of the carbon seal. This axial scoring results in a significant reduction in the effectiveness of the seal.

It is the object of the present invention to provide apparatus to prevent the segmented seal and the shaft being damaged during assembly of the shaft to the seal housing.

SUMMARY OF THE INVENTION

According to the present invention a seal assembly for co-operation with a shaft comprising a sealing member which, in use, in a first position, forms a seal against the shaft, a seal housing for retaining the seal member, means for applying a radially inward force to the seal member and means for applying a radially outward force to the seal member so that, when the means for applying a radially outwards force is operated, the seal member is dilated to a second position thereby enabling the seal assembly and the shaft to be fitted and disassembled in conventional manner, when the means for applying a radially outward force is removed the means for applying a radially inward force to the seal member returns the seal member to the first position.

Preferably the seal assembly is a substantially circumferential seal assembly and the seal member is a substantially circumferential seal assembly. Alternatively, the seal assembly is a substantially axial seal assembly and the seal member is a substantially axial seal member.

Preferably, the means for applying a radially inward force to the seal member comprise a resilient member, the resilient member disposed between the seal housing and the seal member. Preferably, the resilient member is a garter spring.

Preferably, the seal member comprises a magnetic material. Alternatively, a magnetic material is disposed to the seal member.

Preferably, the garter spring is attached to the sealing member. Preferably, the garter spring comprises a magnetic material. Alternatively, the garter spring comprises a magnetostrictive material. Alternatively, the garter spring comprises an electrostrictive material.

Preferably, the means for applying a radially outward force to the seal member comprises a collar comprising magnetic coils which is so disposed to the magnetic material that, in use, the seal member is dilated to a second position. Alternatively, the means for applying a radially outward force to the seal member comprises a collar comprising a permanent magnet which is so disposed to the magnetic material that, in use, the seal member is dilated to a second position. Alternatively, the means for applying a radially outward force to the seal member comprises subjecting the garter spring to an electric current thereby dilating the garter spring and the seal member to the second position.

Alternatively, the means for applying a radially outward force to the seal ring comprises a tube which is so disposed to the seal ring that, in use, when the tube is internally pressurised the seal ring is dilated to a second position. Preferably, the tube is an elastomeric material. Preferably, the tube is disposed within the garter spring.

Preferably, the seal member comprises any material selected from the group of carbon, diamond-like carbon, fluoropolymers, polytetrafluoroethylene.

Preferably, a back plate and retaining ring are disposed in operative association with the seal housing to support a second resilient member, the second resilient member providing a substantially axial force to axially position the seal member in the seal housing. Alternatively, the seal housing comprises an integral back plate and retaining ring.

Preferably the second resilient member is a spring.

BRIEF DESCRIPTION OF THE DRAWINGS

The present invention will now be described, by way of example, with reference to the accompanying drawings in which:

FIG. 1 is a sectioned view of a first generalised application of the present invention.

FIG. 2 is a sectioned view of a second generalised application of the present invention.

DETAILED DESCRIPTION OF THE INVENTION

With reference to FIG. 1, it can be seen that a seal assembly 10 comprises an annular seal housing 12 surrounding a shaft 14. The shaft 14, in use, rotates about its main axis 13. The purpose of the seal assembly 10 is to restrict fluids A or B migrating across the seal assembly 10. The fluid B is at a higher pressure than A and so the fluid B tends to leak through the seal 10.

The seal 10 also comprises a seal member 16 which in this embodiment is a circumferential seal ring 16. The seal ring 16 is positioned within the annular seal housing 12 and is held axially in place by a back plate 18 itself axially supported by a retaining ring 20. A substantially axially aligned compression spring 22 provides a substantially axial load to force the circumferential seal ring 16 against the seal housing 12.

The circumferential seal ring 16 may be circumferentially segmented, as known in the art and which operates as described in U.S. Pat. Nos. 4,082,296 and 5,558,341, so that a range of radial positions may be accommodated while still providing the required sealing efficiency. In the present invention the seal ring 16 is manufactured from a material substantially comprising carbon although other materials such as carbon composite, fluoropolymers and polytetrafluoroethylene may be used. The fluoropolymers may form a composite materials with fibreglass, ceramic fibres or a metallic open mesh fabric. Alternatively, any combination of any of these materials would be appropriate so that the seal ring 16 possesses the physical properties of a low coefficient of friction and low wear.

In operation of the seal 10 the circumferential seal ring 16 is held against the shaft 14 by a garter spring 24 which extends circumferentially around the whole or a substantial portion of the seal ring 16. The space 26 defined by the seal housing 12, the back plate 18 and the seal ring 16, in operation, may contain fluid A. Fluid A comprises a mixture of air and oil, the oil being present as a liquid or mist. The oil within fluid A forms a very thin film between complimentary sealing surfaces 34, 36 of the seal ring 16 and the shaft 14 respectively and typically the film is 1–3 molecules of oil thick.

Conventionally, during assembly of the shaft to the seal housing 12, a tool (not shown) is inserted to dilate the seal ring 16 radially, the shaft 14 is then inserted with the tool between the shaft 14 and the seal ring 16. The tool is then withdrawn in a generally axial direction and the seal ring 16 then co-operates with the shaft 14 to partition fluids A and B. During the insertion and removal of the tool, the seal ring 16 and the shaft 14 complimentary surfaces 34, 36 may become damaged. In particular the insertion and withdrawal of the tool creates axial, relative to the main axis 13 of the shaft 14, score marks in the surfaces 34, 36 of both. These score marks are particularly deleterious to the seal integrity as fluids may then flow along the score marks.

The present invention relates to providing the means to radially dilate the circumferentially segmented seal ring 16 to permit both fitting and disassembly of the seal 10 and shaft 14 without causing damage to the sealing surfaces 34, 36. In this embodiment, as shown in FIG. 1, the seal ring 16 comprises material 28 which has magnetic properties. To radially dilate the seal ring 16, during fitting of the shaft 14, a collar 30 having magnetic coils 32 is disposed around or a substantial part of the circumference the seal housing 12. In use, the magnetic coils 32 are then energised, which generate an appropriate strength magnetic field to attract the magnetic material 28, overcoming the garter spring 24 and thereby dilating the seal ring 16. The magnetic field provides enough force to overcome the garter spring 24. The shaft 14 is then fitted to the seal 10 in a desired position, the coils 32 de-energised and the collar 30 removed. As the coils 32 are de-energised the garter spring 24 provides a returning force to radially contract the seal ring 16 until the seal ring 16 surface 34 contacts the shaft 14 surface 36.

It is preferable to use magnetic coils 32 which employ an alternating current. Using an alternating current and slowly reducing the power, supplied to the magnetic coils 32 during de-energisation, and thereby the strength of the magnetic field, reduces the likelihood of surrounding components becoming magnetised.

Alternatively, in the present invention the collar 30 may comprise a permanent magnet (not shown) in place of the magnetic coils 32.

Furthermore, other embodiments of the present invention may easily be made, but are intended to be within the scope of the present invention. For example, the magnetic material 28 may be in the form of magnetic material 28 laid on the outer surface of the seal ring 16, a magnetic material integrally cast in the seal ring 16 or a retro fitted insertion.

An alternative embodiment of the present invention is where the garter spring 24 is attached to the seal ring 16 and the garter spring 24 is itself subject to a dilating force thereby also dilating the seal ring 16. This may be achieved in a number of ways. The garter spring 24 may be manufactured from a magnetic material rather than having a magnetic material 28 disposed to the seal ring 16. Thereby the seal member 16 is dilated as described hereinbefore.

Alternatively, the garter spring 24 may be manufactured from a magnetostrictive material, such a material may comprise 30% Terbium, 70% Dysprosium and trace Iron. The magnetostrictive material may alternatively comprise any of the magnetic transition elements or the rare earth materials. When the collar 30 is disposed to the seal assembly 10 and the magnetic coils 32 energised, the resulting magnetic field operates in operative association with the magnetostrictive material of the garter spring 24 thereby dilating the garter spring 24.

Alternatively, a further embodiment comprises the garter spring 24 manufactured from an electrostrictive material such as lead zirconal titanate, strontium titanate, lead magnesium niobate and may be in the form of a polymer such as polyvinylidene fluoride. The means for applying a radially outward force to the seal ring 16 being derived from subjecting the electrostrictive material to an electric current, which causes the garter spring 24 to dilate and which in turn dilates the seal ring 16.

A further alternative embodiment of the present invention is the replacement of the garter spring 24 with a magnetostrictive member (not shown) attached to the segments of the seal ring 16. When the magnetostrictive member is not activated the seal ring 16 is held in the first position and when subjected to a magnetic field, as hereinbefore described, the magnetostrictive member forces the seal ring to the second position. Similarly, the magnetostrictive member may be replaced by a similarly configured electrostrictive member (not shown) which may be operated as hereinbefore described.

All embodiments having the common purpose of providing a means to magnetically dilate the circumferentially segmented seal ring 16.

In FIG. 2, a second embodiment of the present invention is shown. FIG. 2 has reference numbers as shown in FIG. 1 for common components.

This second embodiment is particularly suited, but not exclusively, where the seal housing 12 is not magnetically permeable. Here a circumferential tube 38 is provided within the garter spring 24. The tube 38 is made from an elastomeric material such as a natural rubber, synthetic rubber like polychloroprene or polyurethane. To radially dilate the circumferentially segmented seal ring 16 the elastomeric tube 38 is internally pressurised with engine oil or other suitable fluid. This engine oil is the same type of oil that is found in fluid A. As the elastomeric tube 38 is being pressurised the radially inward force of the garter spring 24 is overcome and the seal ring 16 dilates radially outward. The shaft 14 is then inserted into the seal 10 until it is positioned appropriately, a hollow needle (not shown) is then inserted into the tube to release the oil pressure within. As the pressure decreases in the tube 38 the garter spring 24 radially contracts the seal ring 16 until the seal ring 16 contacts the shaft 14.

It is an advantage, for this embodiment of the present invention to provide an elastomeric tube 38 which is self sealing as known in the art, having been punctured by the hollow needle. To remove the shaft 14 from the seal 10 the needle is reinserted to the elastomeric tube 38 and re-pressurised with engine oil. The self-sealing property of the elastomeric tube 38 is then evident as beneficial as the puncture hole is not re-opened.

Furthermore, other embodiments of the present invention may easily be made, but are intended to be within the scope of the present invention. For example, the tube 38 may be positioned or disposed anywhere to the seal ring 16 so as to provide a dilating force to the seal ring 16 during assembly of the shaft 14 and seal 10. The tube 38 is preferably fabricated from elastomeric material which having been pierced by a hollow needle has self sealing capabilities. All the embodiments having the common purpose of providing a means to dilate the circumferentially segmented seal ring 16.

The design of a seal ring 16 is a compromise between using a hard but brittle material, which has a high resistance to wear, and a softer less brittle material which is more resistant to damage such as chipping. It is therefore a further advantage of the present invention to use a seal ring 16 which is harder and therefore extends the service life of the seal ring 16. In particular the present invention enables the seal ring 16 to be manufactured from diamond-like carbon.

The present invention may also be adapted to perform a similar function with respect to an axial seal (not shown) of configuration as known in the art. In this embodiment the sealing member 16 is aligned in a substantially axial direction to the shaft 14.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A seal assembly for co-operation with a shaft comprising
   a seal member which, in use, in a first position, forms a seal against the shaft,
   a seal member which, in use, in a first position, forms a seal against the shaft,
   a seal housing for retaining the seal member,
   means for applying a radially inward force to the seal member and
   means for applying a radially outward force to the seal member so that, when the means for applying a radially outward force is operated, the seal member is dilated to a second position in which the seal member is disengaged with the shaft thereby enabling the seal assembly and the shaft to be fitted and disassembled in a conventional manner and, when the means for applying a radially outward force is removed, the means for applying a radially inward force to the seal member returns the seal member to the first position.

2. A seal assembly for co-operation with a shaft as claimed in claim 1 wherein the seal assembly is a substantially circumferential seal assembly.

3. A seal assembly for co-operation with a shaft as claimed in claim 2 wherein the seal member is a substantially circumferentially segmented seal ring.

4. A seal assembly for co-operation with a shaft as claimed in claim 1 wherein the seal assembly is a substantially axial seal assembly.

5. A seal assembly for co-operation with a shaft as claimed in claim 1 wherein the seal member is a substantially axial seal member.

6. A seal assembly for co-operation with a shaft as claimed in claim 1 wherein the means for applying a radially inward force to the seal member comprise a resilient member, the resilient member disposed between the seal housing and the seal member.

7. A seal assembly for co-operation with a shaft as claimed in claim 6 wherein the resilient member is a garter spring.

8. A seal assembly for co-operation with a shaft as claimed in claim 1 wherein the seal member comprises a magnetic material.

9. A seal assembly for co-operation with a shaft as claimed in claim 1 wherein a magnetic material is disposed in the seal member.

10. A seal assembly for co-operation with a shaft as claimed in claim 7 wherein the garter spring is attached to the sealing member.

11. A seal assembly for co-operation with a shaft as claimed in claim 10 wherein the garter spring comprises a magnetic material.

12. A seal assembly for co-operation with a shaft as claimed in claim 10 wherein the garter spring comprises a magnetostrictive material.

13. A seal assembly for co-operation with a shaft as claimed in claim 8 wherein the means for applying a radially outward force to the seal member comprises a collar comprising magnetic coils which is so disposed to the magnetic material that, in use, the seal member is dilated to a second position.

14. A seal assembly for co-operation with a shaft as claimed in claim 8 wherein the means for applying a radially outward force to the seal member comprises a collar comprising a permanent magnet which is so disposed to the magnetic material that, in use, the seal member is dilated to the second position.

15. A seal assembly for co-operation with a shaft as claimed in claim 10 wherein the garter spring comprises an electrostrictive material.

16. A seal assembly for co-operation with a shaft as claimed in claim 15 wherein the means for applying a radially outward force to the seal member comprises a subjecting the garter spring to an electrical current thereby dilating the garter spring and the seal member to the second position.

17. A seal assembly for co-operation with a shaft as claimed in claims 1 wherein the means for applying a radially outward force to the seal ring comprises a tube which is so disposed to the seal ring that, in use, when the tube is internally pressurised the seal ring is dilated to the second position.

18. A seal assembly for co-operation with a shaft as claimed in claim 17 wherein the tube comprises an elastomeric material.

19. A seal assembly for co-operation with a shaft as claimed in claim 17 wherein the tube is disposed within the garter spring.

20. A seal assembly for co-operation with a shaft as claimed in claim 1 wherein the seal member comprises any material selected from the group of carbon, diamond-like carbon, fluoropolymers, polytetrafluoroethylene.

21. A seal assembly for co-operation with a shaft as claimed in claim 10 wherein a back plate and retaining ring are disposed in operative association with the seal housing to support a second resilient member, the second resilient member providing a substantially axial force to axially position the seal member in the seal housing.

22. A seal assembly for co-operation with a shaft as claimed in claim 20 wherein the seal housing comprises an integral back plate and retaining ring.

23. A seal assembly for co-operation with a shaft as claimed in claim 21 wherein the second resilient member is a spring.

* * * * *